United States Patent
MacLellan et al.

(10) Patent No.: US 11,327,816 B2
(45) Date of Patent: May 10, 2022

(54) MONITORING COMPONENTS IN A SERVICE FRAMEWORK

(71) Applicant: International Business Machines Corporation, Armonk, NY (US)

(72) Inventors: Scot MacLellan, Rome (IT); Marco Mechelli, Rome (IT); Antonio Perrone, Rome (IT); Antonio Romeo, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/473,194

(22) Filed: Mar. 29, 2017

(65) Prior Publication Data

US 2017/0206121 A1 Jul. 20, 2017

Related U.S. Application Data

(63) Continuation of application No. 11/963,387, filed on Dec. 21, 2007, now Pat. No. 9,632,897.

(30) Foreign Application Priority Data

Dec. 27, 2006 (EP) .................................... 06127210

(51) Int. Cl.
*G06F 9/44* (2018.01)
*G06F 9/54* (2006.01)
(Continued)

(52) U.S. Cl.
CPC .............. *G06F 9/542* (2013.01); *G06F 11/30* (2013.01); *G06F 11/3006* (2013.01);
(Continued)

(58) Field of Classification Search
CPC ...................................................... G06F 9/542
(Continued)

(56) References Cited

U.S. PATENT DOCUMENTS 5,892,451 A 4/1999 May et al.
6,754,704 B1 6/2004 Prorock
(Continued)

FOREIGN PATENT DOCUMENTS

EP 0852349 A2 7/1998
EP 2097848 A2 9/2009
WO 2008077653 A2 7/2008

OTHER PUBLICATIONS

Parsons,"Non-intrusive end-to-end runtime path tracing for J2EE systems," In IEE Proceedings—Software vol. 153, No. 4, pp. 149-161, Aug. 2006.
(Continued)

*Primary Examiner* — Timothy A Mudrick
(74) *Attorney, Agent, or Firm* — Cuenot, Forsythe & Kim, LLC

(57) ABSTRACT

A solution is proposed for monitoring usage of bundles in the OSGi environment. For this purpose, an event notification interface of the OSGi environment is exploited. Particularly, each event relating to a change of state of a bundle (such as its addition, removal, starting and stopping) is detected by an auxiliary bundle—which previously subscribed to the event notification interface. The auxiliary bundle can then forward the detected events to a licensing agent, which identifies the bundle by means of a software catalogue. In this way, the desired result is achieved without requiring any instrumentation of the bundles to be monitored.

17 Claims, 5 Drawing Sheets

(51) Int. Cl.
*G06F 21/10* (2013.01)
*G06F 11/30* (2006.01)

(52) U.S. Cl.
CPC ............ *G06F 21/10* (2013.01); *G06F 21/105* (2013.01); *G06F 2221/0797* (2013.01); *G06F 2221/2101* (2013.01)

(58) Field of Classification Search
USPC ........................................................ 719/318
See application file for complete search history.

(56) References Cited

U.S. PATENT DOCUMENTS

| | | | |
|---|---|---|---|
| 6,760,903 | B1 | 7/2004 | Morshed et al. |
| 6,920,615 | B1 | 7/2005 | Campbell et al. |
| 7,908,358 | B1* | 3/2011 | Prasad ................ G06F 11/3476 709/224 |
| 2003/0014521 | A1 | 1/2003 | Elson et al. |
| 2005/0154785 | A1* | 7/2005 | Reed .................. G06F 9/44505 709/217 |
| 2006/0140199 | A1 | 6/2006 | Ma et al. |
| 2008/0216093 | A1 | 9/2008 | MacLellan et al. |

OTHER PUBLICATIONS

WIPO Appln. PCT/EP2007/059567, International Preliminary Report on Patentability and Written Opinion, dated Jan. 5, 2011, 6 pg.
WIPO Appln. PCT/EP2007/059567, International Search Report, dated Jul. 3, 2008, 4 pg.
U.S. Appl. No. 11/963,387, Non-Final Office Action, dated Jun. 8, 2011, 16 pg.
U.S. Appl. No. 11/963,387, Non-Final Office Action, dated Nov. 29, 2011, 14 pg.
U.S. Appl. No. 11/963,387, Final Office Action, dated Apr. 17, 2012, 23 pg.
U.S. Appl. No. 11/963,387, Non-Final Office Action, dated Sep. 23, 2013, 15 pg.
U.S. Appl. No. 11/963,387, Final Office Action, dated Feb. 21, 2014, 24 pg.
U.S. Appl. No. 11/963,387, Examiner's Answer, dated Feb. 9, 2015, 20 pg.
U.S. Appl. No. 11/963,387, Decision on Appeal, dated Sep. 28, 2016, 11 pg.
U.S. Appl. No. 11/963,387, Notice of Allowance, dated Dec. 22, 2016, 7 pg.

* cited by examiner

MONITORING COMPONENTS IN A SERVICE FRAMEWORK

CROSS-REFERENCE TO RELATED APPLICATIONS

This application claims the benefit of European Patent Application No. 06127210.0 filed 27 Dec. 2006 and which is hereby incorporated by reference.

BACKGROUND

Field of the Invention

The present invention relates to the information technology field. More specifically, the invention relates to the monitoring of components in a service framework.

Description of the Related Art

Monitoring software programs in a data processing system is of the utmost importance in several management applications. A typical example consists of a license management application, which is used to collect information about known programs installed and/or running on the system (for example, for charge-back accounting). A commercial license management application available on the market is the "IBM Tivoli License Manager (ITLM)" by IBM Corporation.

Generally, the license management application monitors the processes that are active on the system (for example, by retrieving a list of the active processes periodically or by intercepting the starting of every new process). The program associated with each active process is then identified by comparing characteristics of the active process with pre-defined signatures of all the known programs to be monitored (stored in a software catalogue); generally, each signature specifies one or more attributes (such as name and size) of an executable module associated with the active process (which running indicates the usage of the corresponding program).

However, this approach is not of general applicability. Particularly, the above-described licensing management applications are unable to monitor the usage of interpreted programs—for example, JAVA programs executed in a JAVA Virtual Machine (JVM). Indeed, each JAVA program consists of a series of instructions (written in a high-level language), which instructions are executed one at a time by the JVM. Therefore, when the JAVA program runs, the corresponding active process is only the one associated with the JVM (so that the above-described solution detects the usage of the JVM, but it is completely unable to identify the JAVA program that is executed by the JVM).

A specific example is that of JAVA programs implementing services. Generally speaking, a service consists of a stand-alone basic task; the service may be requested through a well-defined interface, which is independent of its underlying implementation. This promotes the reuse and the interconnection of the services (even among different platforms).

For example, a very popular technology for managing services in the JAVA environment is the one conforming to the Open Services Gateway Initiative (OSGi) standard. The OSGi standard defines a service gateway, wherein the services can discover each other dynamically; in this way, it is possible to deploy new services to any system without requiring its restart. The OSGi standard strongly improves the responsiveness to changing market conditions; moreover, this enables additional after-market opportunities (with the possibility of delivering new services directly in the field).

However, as pointed out above, the licensing management applications known in the art are unable to monitor the usage of the services implemented by the JAVA programs.

In order to solve this problem, in the current practice the JAVA programs are instrumented with a JAVA toolkit being provided by the licensing management application; in this way, each JAVA program is updated to include a call to the licensing management application for notifying its start and stop. However, this solution is ineffective to detect the usage of most of the services—whose JAVA programs are not expressly instrumented for this purpose.

All of the above prevents the implementation of an efficient mechanism for monitoring the services. The problem is very critical, since the service-based applications are becoming increasingly popular, and they are expected to represent a large share of the market.

SUMMARY OF THE INVENTION

In its general terms, the present invention is based on the idea of exploiting an event notification facility for monitoring the services. Particularly, the present invention provides a solution as set out in the independent claims. Advantageous embodiments of the invention are described in the dependent claims.

An aspect of the invention proposes a method for monitoring components that are available in a service framework (for providing services on a data processing system). Each one of the components submits invocations of a service interface of the framework; each invocation requests a change of state of the component. The method includes the step of detecting the invocations (or a part thereof) by an auxiliary component. The components are the identified according to the corresponding detected invocations.

In one embodiment, the detected invocations are forwarded to an (external) metering module (which identifies the desired components). For this purpose, a descriptor of the relevant component is compared with a predefined software catalogue. The proposed technique can be used to monitor the usage of the components. The same technique can also be used to monitor the installation of the components. In one embodiment, an auxiliary component can subscribe to an event notification service of the framework, which can be an OSGi based framework.

It should be noted that various aspects and embodiments of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION OF THE INVENTION

Figure 1A:
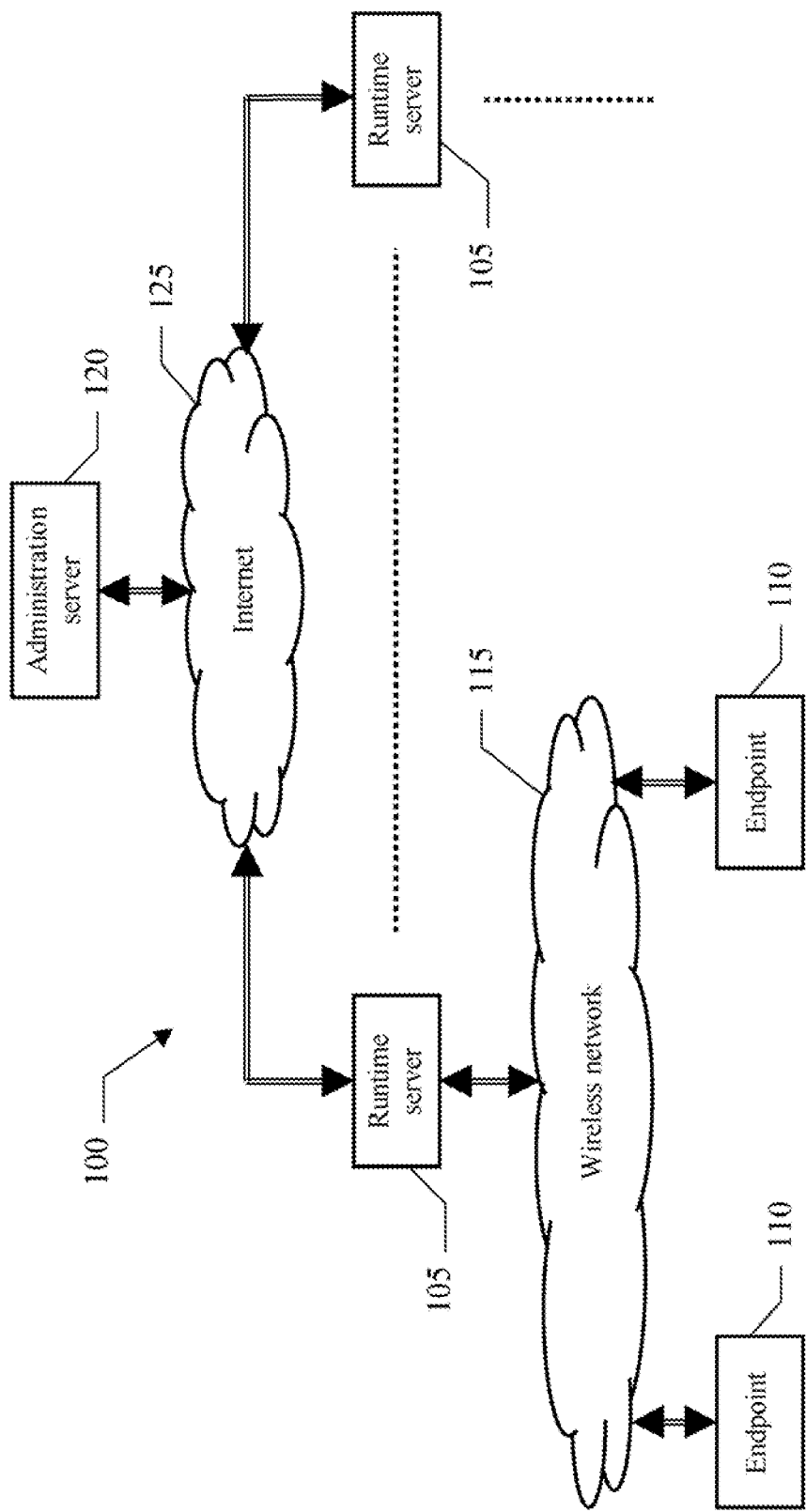
FIG. 1a is a schematic block diagram of a data processing system in which the solution according to an embodiment of the invention is applicable.

With reference in particular to FIG. 1a, a data processing system 100 with distributed architecture is depicted. The system 100 implements a license management application (for example, based on the above-mentioned "ITLM"), which allows monitoring selected software programs. In the example at issue, the software programs are interpreted programs written in the JAVA language. The invention is not to be construed as limited in this regard, however, and other languages can be utilized.

The system 100 includes one or more independent organizations (only one shown in the figure), which are completely separate and distinct from each other. Within the organization, different divisions are defined. Each division is controlled by a runtime server 105, which collects information about the usage and/or the installation of assigned JAVA programs on a set of corresponding endpoints (or nodes) 110; for this purpose, the runtime server 105 and all the endpoints 110 of the division communicate through a network 115 (for example, of the wireless type). The different runtime servers 105 report to a single administration server 120, which implements a central control point for inventory and procurement of the whole organization. The runtime servers 105 and the administration server 120 can be connected to a different network 125, such as a Virtual Private Network (VPN) based on the Internet.

Figure 1B:
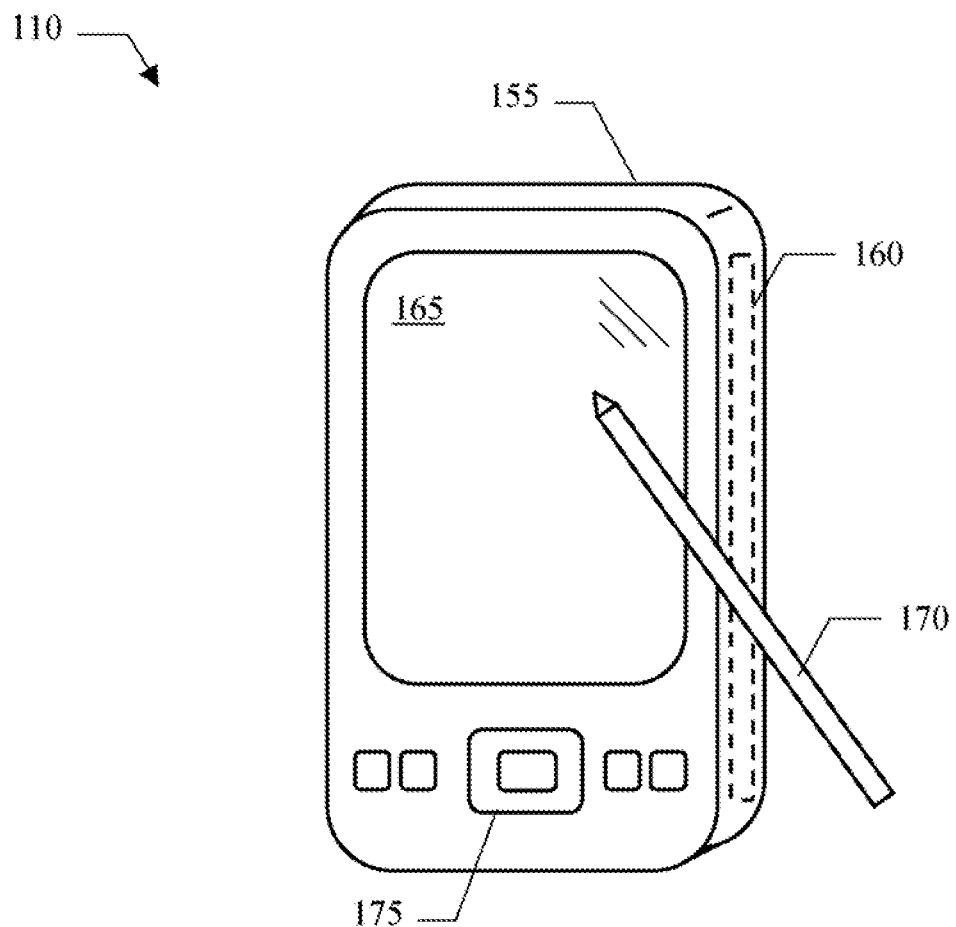
FIG. 1b is a pictorial representation of a Personal Data Assistant (PDA) that can be used in the system.

Moving to FIG. 1b, a generic endpoint 110 is illustrated; for example, the endpoint 110 consists of a PDA, also known as palmtop or pocket computer. Other types of endpoints 110 are contemplated, such as a desktop computer, a mobile phone, a navigation device, a kiosk, an embedded computing device, a wearable computer, and the like.

The PDA 110 is formed by a shell 155, which houses all the electronic circuits 160 controlling its operations. Typically, these electronic circuits 160 include a microprocessor, a working memory, a solid-state mass memory, drives for any input/output units, a wireless network adapter (for example, of the Wi-Fi type), and the like. A user interacts with the PDA 110 via a touch-screen 165 (provided on a front panel of the shell 155). A detachable electronic pen (or stylus) 170 is used to enter information on the touch-screen 165 (by tapping symbols/commands on a virtual keyboard, or by entering handwritten text for its automatic recognition). Typically, the PDA 110 is also provided with a few physical buttons 175 (for example, reserved for shortcuts to specific functions).

Figure 2:
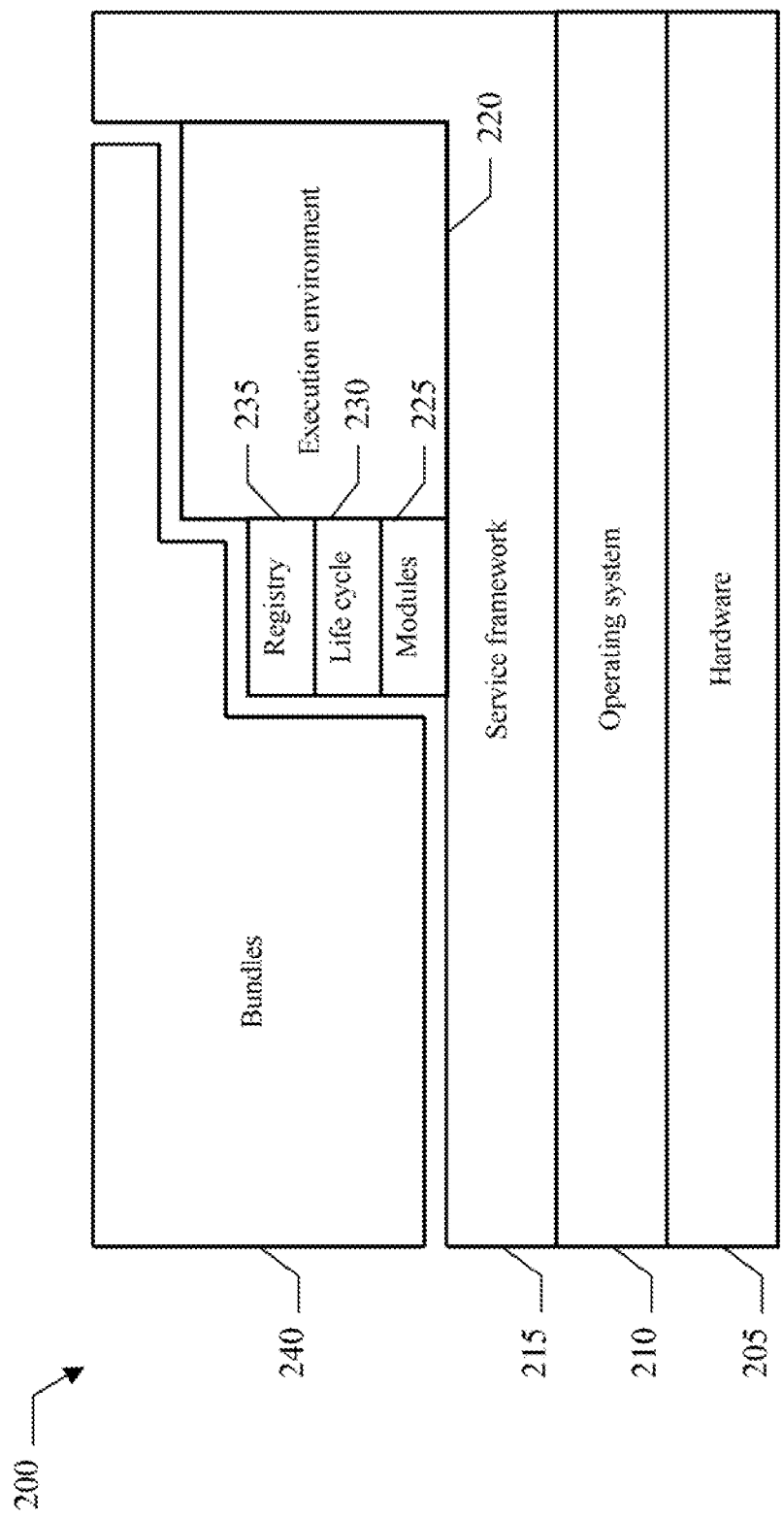
FIG. 2 shows the functional blocks of the PDA.

Moving to FIG. 2, the main (hardware and/or software) functional components of the PDA are denoted as a whole with the reference 200.

Particularly, the PDA of FIG. 1a (or any other computing device implemented in accordance with the inventive arrangements presented herein) is built on a hardware platform 205 (including the above-mentioned physical artifacts). An operating system 210 (for example, Linux) directly controls any resources of the hardware platform 205; the operating system 210 thus implements a software platform of the host device, which provides all the basic functions required for its operation.

A service framework 215 runs on top of the operating system 210. The framework 215 defines a structure serving as a support for the development and organization of different services. Each service (for example, conforming to the "Service Oriented Architecture", or SOA) consists of a repeatable task, which may be performed by any provider entity on behalf of any consumer entity; the service is defined by a formal specification of its function (a so-called contract), which contract is independent of the actual implementation of the service.

The framework 215 prescripts how the services should be built and how they should interact; generally, the framework 215 also provides actual programs (such as development tools, libraries, and the like), which may be used to build any standard functions of the desired services. Preferably, the framework 215 conforms to the OSGi standard, which provides a service gateway for the JAVA environment. A commercial example of OSGi implementation is the "Service Management Framework (SMF)" by IBM Corporation.

More in detail, the (OSGi) framework 215 is divided in a number of layers. Particularly, an execution environment layer 220 (L0) provides the minimum requirements for running the services (for example, consisting of the JAVA Platform Standard Edition, or J2SE). A modules layer 225 (L1) defines class loading policies for the services; this adds modularization to the structure of the classes (for example, with the possibility of specifying private classes and controlled linking). A life cycle layer 230 (L2) implements a series of functions for managing the services at run-time. At the end, a service registry layer 235 (L3) is used by the services to cooperate among them; for this purpose, the registry layer 235 implements a registry, which lists all the services that are available (with the corresponding functions that can be invoked).

In the OSGi environment, the services are implemented by components (or bundles) 240; each bundle 240 consists of a set of JAVA packages (i.e., classes and resources) providing specific function(s). Each service is specified by a JAVA interface, which is implemented by the bundles 240 providing an actual realization of the service. Typically, the bundles 240 consist of front-end modules of services that have been discovered and then downloaded from the Internet (such as by means of a standard JINI service); for example, the bundles 204 are used to translate texts, to supply information, and the like.

Figure 3:
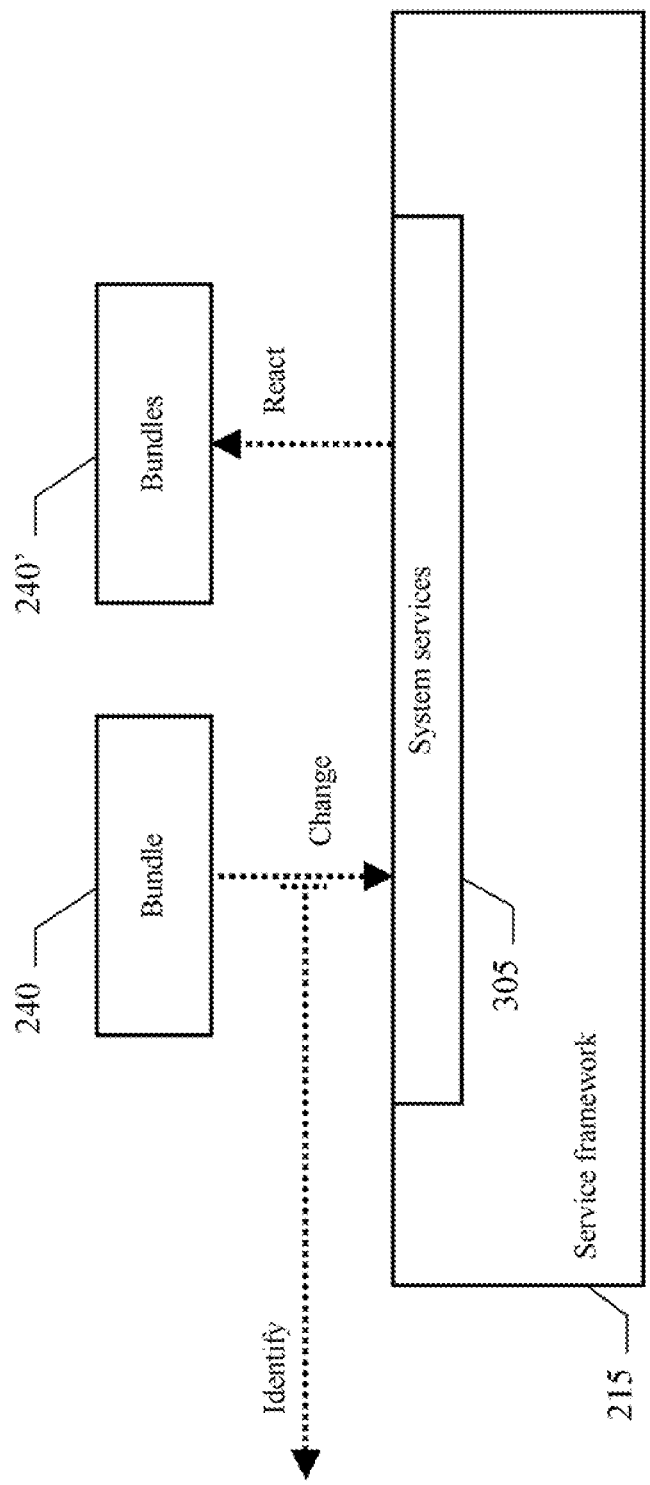
FIG. 3 illustrates an exemplary application of the solution according to an embodiment of the invention.

Moving now to FIG. 3, the framework 215 offers a set of system services, which provide standardized Application Program Interfaces (APIs) for the management of the bundles 240. For example, the system services are used to control the bundles 240 remotely, or to compose the bundles 240 into more complex applications (with the bundles 240 that interact in a very fast way through direct-method invocations); other system services are used to notify events, to administer security controls, to log information, to map external protocols, and the like.

Particularly, whenever a generic bundle 240 must change its state (for example, to add, remove, start, stop, or update it), the bundle 240 submits an invocation of a corresponding system service to the framework 215. All the other bundles (differentiated by means of a prime notation, i.e., 240') are listening for any event involving a change of state of the bundle 240 (by means of the corresponding system service, as it will be apparent in the following). In this way, each bundle 240' may react to any change of state of the bundle 240 accordingly (so as to provide the desired dynamism in the discovering of the available services).

In the solution according to an embodiment of the present invention, as described in detail in the following, the events relating to the changes of state of the bundle 240 (or at least some of them) are also used to identify the bundle 240 with its current state (for example, by means of another dedicated bundle that interfaces with the license management application).

This makes it possible to monitor the bundles (and then of the corresponding services) in a very simple way. This result is achieved without requiring any instrumentation of the JAVA programs that implement the services to be monitored. Therefore, the proposed solution is of general applicability (in other words, it allows monitoring any kind of services). As a result, it is now possible to carry out a full control of the services.

In the specific example at issue, this has a beneficial effect on the accuracy of the monitoring performed by the license management application; these advantages are clearly perceived in modern data processing systems (such as based on the Internet), wherein the service-based applications represent a large share of the market.

Figure 4:
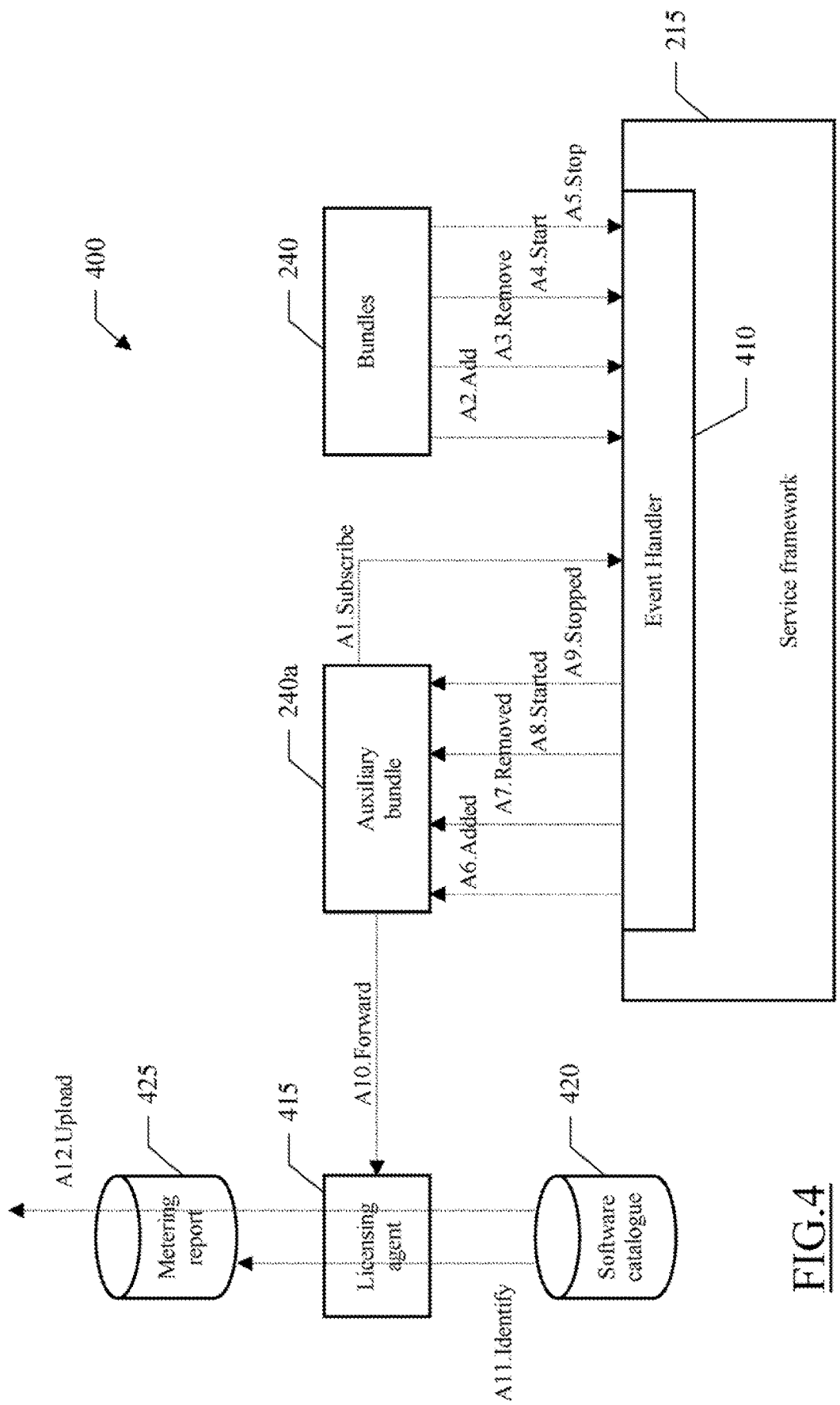
FIG. 4 is a collaboration diagram representing the roles of different software modules that may be used to implement the solution according to an embodiment of the invention.

With reference now FIG. 4, the main software modules that can be used to implement the solution according to an embodiment of the invention are denoted as a whole with the reference 400. The information (programs and data) is typically stored on the mass memory and then loaded (at least partially) into the working memory of the PDA when the programs are executed. The programs are initially installed onto the mass memory, for example, through a wireless connection. Particularly, the figure describes the static structure of the system (by means of the corresponding modules) and its dynamic behavior (by means of a series of exchanged messages, each one representing a corresponding action, denoted with sequence numbers preceded by the symbol "A").

Particularly, in the solution according to an embodiment of the present invention, an auxiliary bundle 240a subscribes as a listener to the system service of the framework 215 handling the notification of events (action "A1.Subscribe"); for example, this event notification service—denoted with 410—implements the interface "org.osgi.service.EventHandler" (or simply "EventHandler"). The subscription specifies a parameter, which consists of a topic identifying the types of events which the auxiliary bundle 240a is interested to; preferably, the topic filters the events (to be notified to the auxiliary bundle 240a), so as to provide the ones relating to the change of states of the other bundles 240a only (such as their addition/removal, starting/stopping, or both of them).

A generic bundle 240 publishes events relating to any change of its state to the event notification service 410; for example, this result is achieved by calling a method "send" (when the event must be managed synchronously) or a method "post" (when the event must be managed asynchronously) on the interface "EventHandler". Particularly, the bundle 240 publishes an event when it is added, so as to have it inserted into the registry of the framework 215 (Action "A2.Add"); conversely, the bundle 240 publishes another event when it is removed, so as to have it deleted from the same registry (action "A3.Remove"). On the other hand, the bundle 240 publishes an event when it is started; in this way, the bundle 240 becomes available for any other bundle (acting as a consumer of the corresponding service), as indicate by a corresponding attribute for the bundle 240 in the registry (action "A4.Start"); conversely, the bundle 240 publishes another event when it is stopped; as a result, the bundle 204 is no longer available for the other bundles—with the corresponding entry in the registry that is updated accordingly (action "A5. Stop").

The auxiliary bundle 240a is notified of any event (matching the desired topic) that is published by the bundles 240. The event is represented by an object of the type "org.osgi.service.event.Event" (or simply "Event"); the object "Event" has an attribute, which consists of the topic identifying the type of event (which is used to match the filtering criterion specified by the auxiliary bundle 240a when subscribing to the interface "EventHandler"); another attribute instead consists of properties, which provide information about the occurred event.

Particularly, the auxiliary bundle 240a is notified of the addition of any new bundle 240 that is inserted into the registry of the framework 215 (action "A6.Added"); conversely, the auxiliary bundle 240a is notified of any removal of a bundle 240 that is deleted from the same registry (action "A7.Removed"). On the other hand, the auxiliary bundle 240a is notified when any bundle 240 is started becoming available for the other bundles (action "A8.Started"); conversely, the auxiliary bundle 240a is notified when any bundle 240 is stopped, so as to be no longer available (action "A9. Stopped").

In any case, the auxiliary bundle 240a forwards an indication of any notified event to a licensing agent 415—of the above-described licensing application (action "A10.Forward"). The information provided to the licensing agent 415 consists of a descriptor of the bundle 240 relating to the detected event, together with an indication of the topic thereof. Preferably, the auxiliary bundle 240a converts the information into the format being supported by the licensing application. In this way, the licensing agent 415 receives the same information that should have been provided by the bundles when instrumented for interacting with the licensing application. Therefore, the proposed solution is completely opaque to the licensing application (which can manage any notification from either the auxiliary bundle 240a or the instrumented bundles exactly in the same way).

In response thereto, the licensing agent 415 identifies the service corresponding to the descriptor and its change of state. For this purpose, the licensing agent 415 exploits a local copy of a software catalogue 420 that is downloaded from the runtime server of the division (not shown in the figure)—for example, periodically or at any change thereof; the software catalogue 320 identifies each known service to be monitored in the division by means of the descriptor of the corresponding bundle. The information relating to the identified service (such as its name, addition time, removal time, starting time, stopping time, and the like) is inserted into a metering report 425 (action "A11.Identify"). Periodically (for example, at the end of every day), the licensing agent 415 uploads the metering report 420 to the administration server of the division (not shown in the figure), which aggregates the information received from the different endpoints of the division (action "A12.Upload").

Naturally, in order to satisfy local and specific requirements, a person skilled in the art may apply to the solution described above many modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution also lends itself to be implemented with an equivalent method (by using similar steps, removing some non-essential steps, or adding further optional steps—even in a different order).

It is emphasized that the reference to the JAVA language is merely illustrative; similar considerations apply to different languages (such as VisualBasic), to scripts, or more generally to any other components that are available in a service framework for providing whatever services.

Likewise, the change of states of the components may involve the submission of corresponding invocations of an equivalent service interface of the framework (which invocations may then be detected and used to identify the components in any other way).

It should be readily apparent that the exploitation of the proposed solution is not limited to any specific licensing application; particularly, the available information may be simply used to verify compliance with applicable conditions of use, or more generally for whatever management purpose. More generally, the solution according to the present invention lends itself to be used in different environments (such as for monitoring applications). In any case, nothing prevents performing the identification of the services directly by the auxiliary bundle.

Alternatively, the services may be identified by means of other information (for example, explicitly retrieved from the registry); naturally, the software catalogue may be replaced with any other equivalent structure suitable for this purpose.

Although in the preceding description reference has been made to the detection of both the addition/removal and the starting/stopping of the services, this is not to be interpreted in a limitative manner. For example, nothing prevents monitoring the usage of the services only, their installation only, or more generally any other activity of interest.

Similar considerations apply if an equivalent event notification service is used to detect any change of state of the bundles; however, the use of any other technique for detecting these events is within the scope of the invention.

Naturally, the auxiliary bundle may specify different filtering criteria when subscribing to the "EventHandler" interface (even if this feature is not strictly necessary and it may be omitted in a simplified implementation of the proposed solution).

It should be readily apparent that the reference to the OSGi standard must not be constructed in a limitative manner; in other words, nothing prevents applying the same technique to any other service environment having compatible characteristics.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Even though in the preceding description reference has been made to a specific service that is deployed on the PDA for monitoring the other bundles, this is not to be intended as a limitation (with the same result that may also be achieved by means of any equivalent service).

Alternatively, the proposed method may be carried out on a PDA having a different architecture or including equivalent units (such as cache memories temporarily storing the programs or parts thereof to reduce the accesses to the mass memory during execution). Moreover, it is possible to replace the PDA with any other pervasive device (such as a mobile phone, a GPS navigator, and the like). More generally, the proposed solution may be implemented in a computer (even of the stand-alone type), a network of computers, or any other data processing entity or combination thereof (such as a client/server architecture, a grid computing infrastructure, and the like).

Generally, it should be appreciated that the present invention may be realized in hardware, software, firmware, or a combination of hardware/software/firmware. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for monitoring a component in a service framework within a computer hardware system, comprising:
 receiving, by an auxiliary component, a notification of an insertion or deletion of a bundle to a registry of the service framework that includes a list of all available services and corresponding functions capable of being invoked; and forwarding, by the auxiliary component and to a licensing agent, an indication corresponding to the notification, wherein the auxiliary component converts the notification into a format supported by the licensing agent.

2. The method of claim 1, wherein
the auxiliary component subscribes to an event handler configured to receive events from the component,
the subscription specifies an event from the component relating to a change of state of the component, and
the event handler sends the notification to the auxiliary component based upon the event matching the subscription.

3. The method of claim 2, wherein
the indication includes a descriptor of the component and a topic that identifies a type of the event.

4. The method of claim 1, wherein
the auxiliary component monitors the component without instrumenting the component.

5. The method of claim 1, wherein
the licensing agent is configured to receive the indication from both the auxiliary component and the component.

6. The method of claim 1, wherein
a service is implemented by the component.

7. A computer hardware system configured to monitor a component in a service framework within the computer hardware system, comprising:
  a hardware processor configured to initiate the following operations:
    receiving, by an auxiliary component, a notification of an insertion or deletion of a bundle to a registry of the service framework that includes a list of all available services and corresponding functions capable of being invoked; and
    forwarding, by the auxiliary component and to a licensing agent, an indication corresponding to the notification, wherein
  the auxiliary component converts the notification into a format supported by the licensing agent.

8. The system of claim 7, wherein
the auxiliary component subscribes to an event handler configured to receive events from the component,
the subscription specifies an event from the component relating to a change of state of the component, and
the event handler sends the notification to the auxiliary component based upon the event matching the subscription.

9. The system of claim 8, wherein
the indication includes a descriptor of the component and a topic that identifies a type of the event.

10. The system of claim 7, wherein
the auxiliary component monitors the component without instrumenting the component.

11. The system of claim 7, wherein
the licensing agent is configured to receive the indication from both the auxiliary component and the component.

12. The system of claim 7, wherein
a service is implemented by the component.

13. A computer program product, comprising:
a computer-usable hardware storage device having stored therein program code for monitoring a component in a service framework within a computer hardware system,
the program code, which when executed by the computer hardware system, causes the computer hardware system to perform:
  receiving, by an auxiliary component, a notification of an insertion or deletion of a bundle to a registry of the service framework that includes a list of all available services and corresponding functions capable of being invoked; and
  forwarding, by the auxiliary component and to a licensing agent, an indication corresponding to the notification, wherein
the auxiliary component converts the notification into a format supported by the licensing agent.

14. The computer program product of claim 13, wherein
the auxiliary component subscribes to an event handler configured to receive events from the component,
the subscription specifies an event from the component relating to a change of state of the component, and
the event handler sends the notification to the auxiliary component based upon the event matching the subscription.

15. The computer program product of claim 14, wherein
the indication includes a descriptor of the component and a topic that identifies a type of the event.

16. The computer program product of claim 13, wherein
the auxiliary component monitors the component without instrumenting the component.

17. The computer program product of claim 13, wherein
the licensing agent is configured to receive the indication from both the auxiliary component and the component.

* * * * *